United States Patent [19]
Liu

[11] 3,912,374
[45] Oct. 14, 1975

[54] SIX COMPONENT ZOOM LENS
[75] Inventor: Wai-Min Liu, Arleta, Calif.
[73] Assignee: Xerox Corporation, Stamford, Conn.
[22] Filed: Oct. 17, 1974
[21] Appl. No.: 515,766

[52] U.S. Cl................................. 350/184; 350/215
[51] Int. Cl.².......................................... G02B 15/16
[58] Field of Search............................ 350/184, 186

[56] References Cited
UNITED STATES PATENTS
3,687,522 8/1972 Lynch et al.......................... 350/184
3,865,470 2/1975 McCrobie et al..................... 350/184

*Primary Examiner*—John K. Corbin
*Attorney, Agent, or Firm*—Robert J. Bird

[57] ABSTRACT

A 6-component zoom lens for use between fixed conjugates at magnification ranging from 1:1.02 to 1:0.615. The two outermost components and one inner component are movable relative to the remaining components to vary the focal length of the lens as it is moved between conjugates to vary the image magnification. The inner movable component helps to maintain a flat field over the entire magnification range.

1 Claim, 1 Drawing Figure

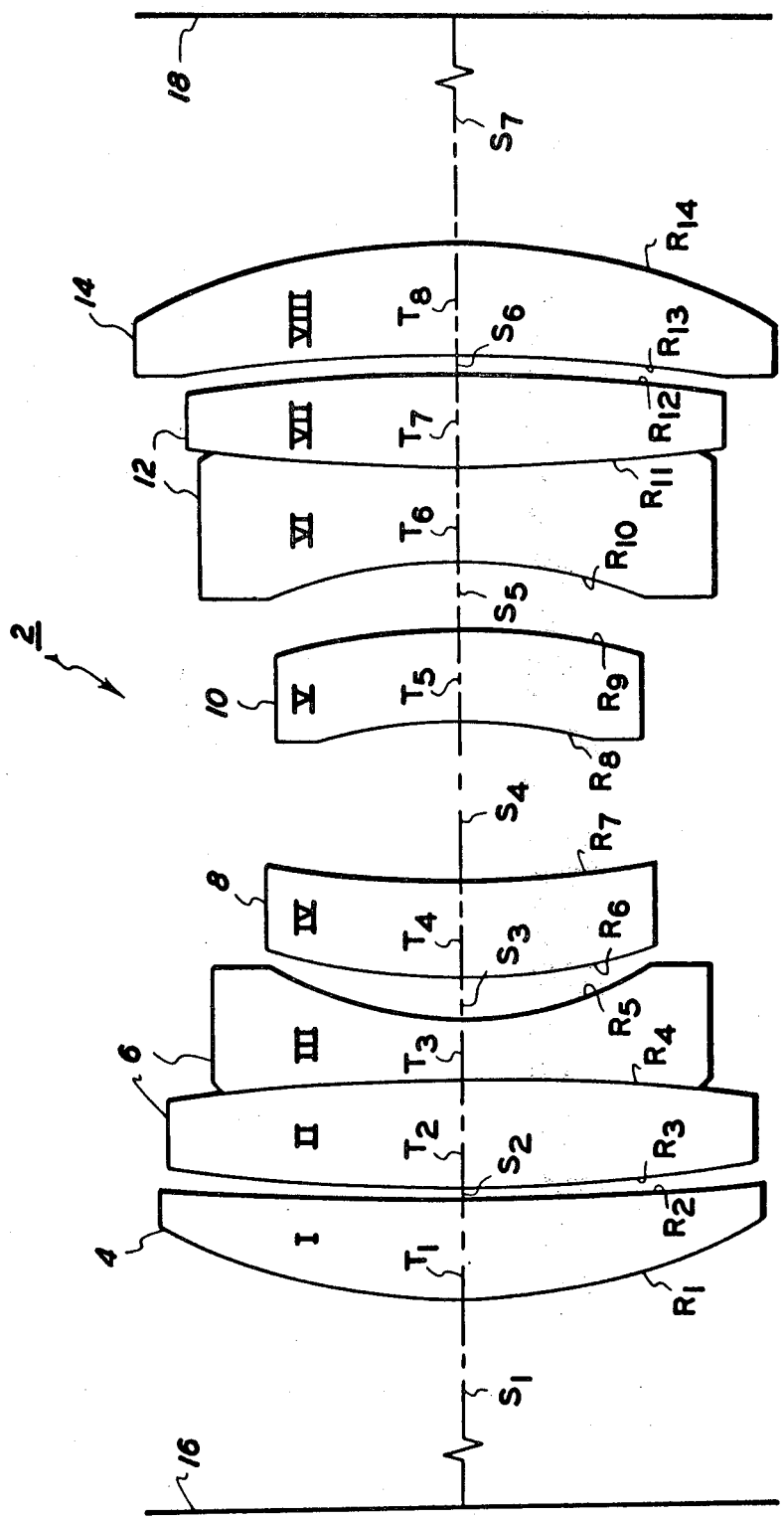

SIX COMPONENT ZOOM LENS

BACKGROUND OF THE INVENTION

This invention relates to variable magnification or zoom lenses, and more particularly to such a lens for use between fixed conjugate planes, as for example in a photocopying apparatus.

The lens disclosed herein is an improvement on that disclosed in copending application Ser. No. 393,844, filed by George L. McCrobie and Roscoe J. Donnel on Sept. 4, 1973 now U.S. Pat. No. 3,865,470.

It is an object of this invention to provide a variable magnification lens for use between fixed conjugate planes in a magnification range of 1:1.02 to 1:0.615.

Another object of this invention is to provide such a variable magnification lens in which the image field is kept substantially flat throughout the magnification range.

DRAWINGS

The drawing is an optical diagram of a variable magnification lens according to the present invention.

DESCRIPTION

Referring now to the drawing, a variable magnification or zoom lens is generally indicated at 2. It includes the following six components in optical alignment: a front single lens 4, a doublet 6, a single lens 8, a single lens 10, a doublet 12, and a back single lens 14. Zoom lens 2 is shown disposed between two fixed conjugate planes, an object plane 16 and an image plane 18.

Front single lens 4 is a convex-concave meniscus lens, also designated I. Doublet 6 includes a double convex lens element II and a double concave lens element III, together forming a convex-concave doublet. Single lens 8 is a convex-concave meniscus lens, also designated IV. Single lens 10 is a concave-convex meniscus lens, also designated V. Doublet 12 includes a double concave lens element VI and a double convex lens element VII, together forming a concave-convex doublet. Back single lens 14 is a concave-convex meniscus lens, also designated VIII.

The entire lens 2 is movable relative to conjugate planes 16 and 18. The front and back single lenses 4 and 14 and the inner doublet 12 are movable lenses relative to the remaining lenses in lens 2. Suitable mechanism is provided for effecting the desired movement but is not a part of this invention and is not shown.

An important feature of this invention is the movement of the inner doublet 12 in conjunction with the outer lenses 4 and 14. Without this feature, and with only the outer elements movable, it was found that image field curvature changed rapidly and image quality deteriorated at the lower magnifications, especially below 1:0.65. The movement of inner doublet 12 functions to keep the image field substantially flat throughout the magnification range.

The parameters of the lens elements which make up a specific zoom lens 2 are listed in the following table in which $N_d$ is the refractive index at 5876A wavelength and $V_d$ is the dispersion value or Abbe number. Radii (R), thicknesses (T), and spacings (S) are expressed in inches and a negative sign indicates lens radii on centers of curvature on the object side of the lens. $S_1$ and $S_7$ indicate respectively spacings from object and image planes to their next adjacent lenses.

| LENS | RADIUS(R) | THICKNESS(T) | SPACINGS | REFRACTIVE INDEX $N_d$ | DISPERSION VALUE $V_d$ |
|---|---|---|---|---|---|
| | | | $S_1 =$ 1.02X--23.30386 1.00X--23.57572 .96X--24.12286 .84X--25.94499 .76X--27.27587 .71X--28.15127 .65X--29.22256 .615X-29.84996 | | |
| I. | $R_1=3.59028$ $R_2=22./9756$ | $T_1=.57334$ | | 1.60729 | 59.46 |
| | | | $S_2 =$ 1.02X--0.10118 1.00X--0.10080 .96X--0.10320 .84X--0.14522 .76X--0.20797 .71X--0.26421 .65X--0.35040 .615X-0.41221 | | |
| II. | $R_3=15.71092$ $R_4=-15.01208$ | $T_2=.68986$ | | 1.61405 | 55.17 |
| III. | $R_5=2.21852$ | $T_3=.35987$ | | 1.56138 | 45.24 |
| IV. | $R_6=3.43879$ $R_7=5.89206$ | $T_4=.58942$ | $S_3 =.21679$ | 1.66755 | 41.93 |
| V. | $R_8=-4.48069$ $R_9=-3.95132$ | $T_5=.58838$ | $S_4 =.95297$ | 1.66672 | 48.42 |
| | | | $S_5 =$ 1.02X--.42503 1.00X--.42150 .96X--.4258 .84X--.43355 .76X--.43500 .71X--.42914 | | |

-continued

| LENS | RADIUS(R) | THICKNESS(T) | SPACINGS | REFRACTIVE INDEX $N_d$ | DISPERSION VALUE $V_d$ |
|---|---|---|---|---|---|
| | | | .65X--.39850 | | |
| | | | .615X-.36247 | | |
| VI. | $R_{10}$=-3.29131 | $T_6$=.55711 | | 1.65016 | 39.15 |
| | $R_{11}$=9.81162 | | | | |
| VII. | | $T_7$=.60492 | | 1.58904 | 53.01 |
| | $R_{12}$=-10.95050 | | | | |
| | | | $S_6 =$ | | |
| | | | 1.02X--.09775 | | |
| | | | 1.00X--.09690 | | |
| | | | .96X--.990 | | |
| | | | .84X--.13327 | | |
| | | | .76X--.19457 | | |
| | | | .71X--.25677 | | |
| | | | .65X--.37350 | | |
| | | | .615X-.47133 | | |
| | $R_{13}$=-25.83312 | | | | |
| VIII. | | $T_8$= .68338 | | 1.65844 | 50.88 |
| | $R_{14}$=-4.04334 | | | | |
| | | | $S_7 =$ | | |
| | | | 1.02X--24.82017 | | |
| | | | 1.00X--24.55005 | | |
| | | | .96X--23.99777 | | |
| | | | .84X--22.11392 | | |
| | | | .76X--20.68479 | | |
| | | | .71X--19.71781 | | |
| | | | .65X--18.49627 | | |
| | | | .615X-17.75186 | | |

What is claimed is:

1. A variable magnification lens for use between fixed conjugates and including the following components in optical alignment:

a first convex-concave meniscus lens I;

a second double convex lens element II, a third double concave lens element III, said second and third elements forming a doublet, a fourth convex-concave meniscus lens IV, a fifth concave-convex meniscus lens V, a sixth double concave lens element VI, a seventh double convex lens element VII, said sixth and seventh elements for forming a doublet, an eighth concave-convex meniscus lens VIII, said second and third elements and said fourth and fifth lenses being fixed relative to each other as a unit, said first and eight lenses and said seventh and eighth elements being movable relative to said unit, the entire variable magnification lens being movable between fixed conjugates, the parameters of lens radii (R), thickness (T), spacings (S), refractive indices (N), and dispersion values (V) being in accordance with the following table wherein radii, thickness, and spacings are expressed in inches and wherein end-most spacings are those between an end lens and its corresponding conjugate plane:

| Lens | Radius (R) | Thickness (T) | Spacings | Refractive Index $N_d$ | Dispersion Value $V_d$ |
|---|---|---|---|---|---|
| | | | $S_1 =$ | | |
| | | | 1.02X--23.30386 | | |
| | | | 1.00X--23.57572 | | |
| | | | .96X--24.12286 | | |
| | | | .84X--25.94499 | | |
| | | | .76X--27.27587 | | |
| | | | .71X--28.15127 | | |
| | | | .65X--29.22256 | | |
| | $R_1$=3.59028 | | .615X-29.84996 | | |
| I. | | $T_1$=.57334 | | 1.60729 | 59.46 |
| | $R_2$=22.19756 | | | | |
| | | | $S_2 =$ | | |
| | | | 1.02X--0.10118 | | |
| | | | 1.00X--0.10080 | | |
| | | | .96X--0.10320 | | |
| | | | .84X--0.14522 | | |
| | | | .76X--0.20797 | | |
| | | | .71X--0.26421 | | |
| | | | .65X--0.35040 | | |
| | | | .615X-0.41221 | | |
| | $R_3$=15.71092 | | | | |
| II. | | $T_2$=.68986 | | 1.61405 | 55.17 |
| | $R_4$=-15.01208 | | | | |
| III. | | $T_3$=.35987 | | 1.56138 | 45.24 |
| | $R_5$=2.21852 | | | | |
| | | | $S_3 =$.21679 | | |
| | $R_6$=3.43879 | | | | |
| IV. | | $T_4$=.58942 | | 1.66755 | 41.93 |
| | $R_7$=5.89206 | | | | |
| | | | $S_4 =$ .95297 | | |
| | $R_8$=-4.48069 | | | | |
| V. | | $T_5$=.58838 | | 1.66672 | 48.42 |
| | $R_9$=-3.95132 | | | | |
| | | | $S_5 =$ | | |
| | | | 1.02X--.42503 | | |
| | | | 1.00X--.42150 | | |
| | | | .96X--.4258 | | |
| | | | .84X--.43355 | | |
| | | | .76X--.43500 | | |
| | | | .71X--.42914 | | |
| | | | .65X--.39850 | | |
| | | | .615X-.36247 | | |
| | $R_{10}$=-3.29131 | | | | |
| VI. | | $T_6$=.55711 | | 1.65016 | 39.15 |
| | $R_{11}$=9.81162 | | | | |
| VII. | | $T_7$=.60492 | | 1.58904 | 53.01 |
| | $R_{12}$=-10.95050 | | | | |
| | | | $S_6 =$ | | |
| | | | 1.02X--.09775 | | |
| | | | 1.00X--.09690 | | |
| | | | .96X--.990 | | |
| | | | .84X--.13327 | | |
| | | | .76X--.19457 | | |
| | | | .71X--.25677 | | |
| | | | .65X--.37350 | | |
| | | | .615X-.47133 | | |
| | $R_{13}$=-25.83312 | | | | |
| VIII. | | $T_8$=.68338 | | 1.65844 | 50.88 |
| | $R_{14}$=-4.04334 | | | | |
| | | | $S_7 =$ | | |
| | | | 1.02X--24.82017 | | |
| | | | 1.00X--24.55005 | | |
| | | | .96X--23.99777 | | |
| | | | .84X--22.11392 | | |
| | | | .76X--20.68479 | | |
| | | | .71X--19.71781 | | |
| | | | .65X--18.49627 | | |
| | | | .615X-17.75186. | | |

* * * * *